United States Patent [19]

Ohsato

[11] Patent Number: 4,612,437
[45] Date of Patent: Sep. 16, 1986

[54] FOCUSSING ERROR DETECTING APPARATUS FOR USE IN AN OPTICAL DISC REPRODUCING DEVICE, AN AUTO-FOCUS CAMERA OR IMAGE-PICKUP DEVICE

[75] Inventor: Kiyoshi Ohsato, Chiba, Japan

[73] Assignee: Sony Corporation, Tokyo, Japan

[21] Appl. No.: 577,838

[22] Filed: Feb. 7, 1984

[30] Foreign Application Priority Data

Feb. 10, 1983 [JP]   Japan ................................ 58-21187

[51] Int. Cl.$^4$ .............................................. G11B 7/12
[52] U.S. Cl. ...................................... 250/201; 369/45; 369/46
[58] Field of Search ................. 250/201 DF, 201 AF; 369/44–46, 112, 120–122; 358/342; 354/403–404, 406

[56] References Cited

U.S. PATENT DOCUMENTS 4,376,303  3/1983  Lurie ..................................... 369/45
4,513,408  4/1985  Nomura et al. ....................... 369/46

FOREIGN PATENT DOCUMENTS 0097140  6/1983  Japan ..................................... 369/45

*Primary Examiner*—Edward P. Westin
*Attorney, Agent, or Firm*—Lewis H. Eslinger; Alvin Sinderbrand

[57] ABSTRACT

A focussing error detecting apparatus comprises a compound lens and a photodetector, in which the compound lens has first and second lens regions having different back focal lengths separated by a boundary plane which includes the optical axis of light incident on the compound lens. The photodetector has its photodetecting face positioned on the optical axis of the light between the focal points of the two lens regions, and includes first and second photodetecting elements for receiving light passed through the first lens region at its outer and inner sections with respect to the boundary plane, respectively, and third and fourth photodetecting elements for receiving light passed through the second lens region at its outer and inner sections respectively. A focussing error signal is produced from the difference between the sum of signals from the first and fourth photodetecting elements and the sum of signals from the second and third photodetecting elements.

15 Claims, 42 Drawing Figures

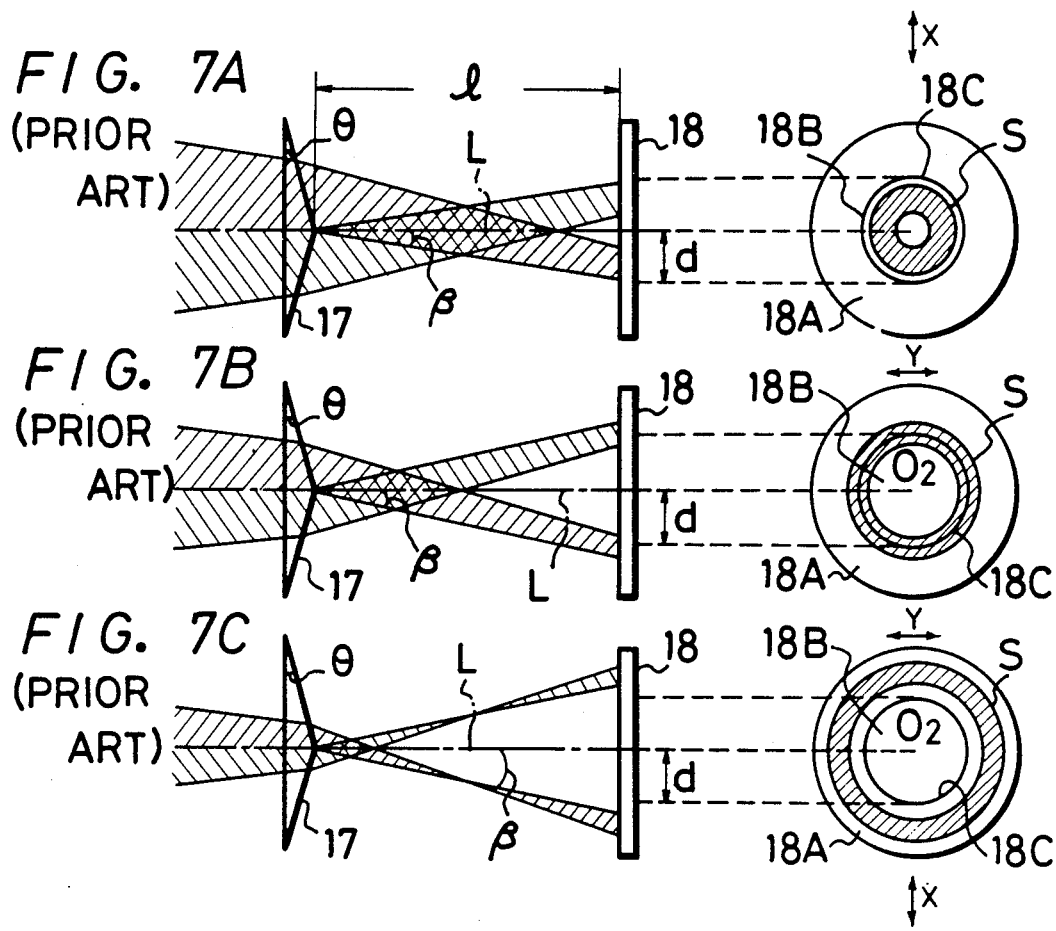
FIG. 7A (PRIOR ART)
FIG. 7B (PRIOR ART)
FIG. 7C (PRIOR ART)
FIG. 8
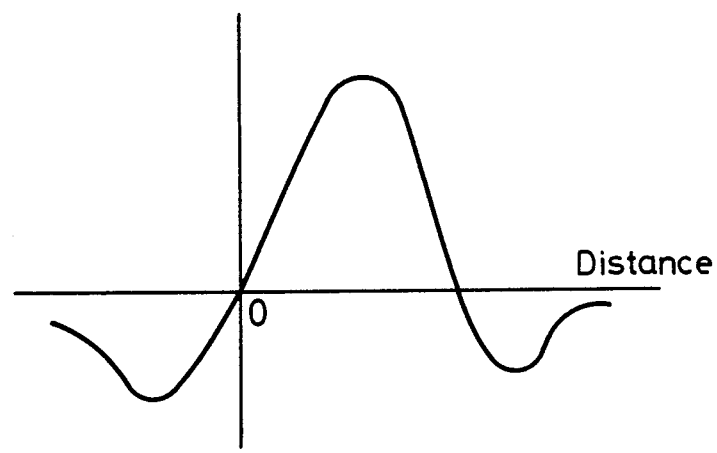

FOCUSSING ERROR DETECTING APPARATUS FOR USE IN AN OPTICAL DISC REPRODUCING DEVICE, AN AUTO-FOCUS CAMERA OR IMAGE-PICKUP DEVICE

BACKGROUND OF THE INVENTION

This invention relates generally to a focussing error detecting apparatus, and more particularly is directed to such apparatus suitable for use in an optical disc reproducing device, an auto-focus camera or image-pickup device, and the like.

In conventional optical disc reproducing devices, a beam of light from a laser light source is converged by an objective lens onto the record surface of an optical disc. The surface of the optical disc has recorded thereon video or audio information in circular or spiral tracks in the form of depressions, e.g. pits, or ridges. The beam is reflected from or transmitted through the disc in such a manner that it is modulated by the pits, and hence in accordance with the information recorded in the tracks. The reflected or transmitted modulated laser beam is then directed onto the detecting face of a photodetector, which generates a reproduced signal in response to the information contained in the modulated light beam. This reproduced signal is further processed and ultimately is reproduced as the video images or audio sounds recorded on the disc.

For accurate reproduction, it is necessary that the laser light beam be focussed exactly on the record surface of the optical disc. When the laser light beam is in this just-focussed state, the pits and ridges in the tracks on the record surface are effective to properly modulate the light beam. However, it may happen that the light beam is under-focussed, that is, the beam is focussed not exactly on the record surface but slightly behind it. In such case, if the objective lens is correspondingly moved slightly away from the disc along the optical axis of the light beam, the light beam would then converge accurately on the record surface. Conversely, the light beam may be over-focussed and converge at a point slightly before the record surface. In this case, the problem may be cured by moving the objective lens slightly closer to the disc, whereby the light beam will then converge exactly on the record surface. These two types of focussing error must be accurately detected and compensated for. To this end, the objective lens is mounted on and controlled by a servomechanism to be movable along the optical axis of the laser light beam towards and away from the optical disc to adjust for the slight under- or over- focussing of the laser light beam.

Focussing error detecting apparatus have been previously proposed for controlling the objective lens in this fashion. In particular, in an optical disc reproducing device using a reflected light beam, the photodetector may be divided into sections or separate photodetecting elements which receive light from separate portions of the reflected light beam. Each section produces a signal in response to the amount or intensity of the light which it receives. These signals are then combined to create a focussing control signal dependent on the state of the light beam, i.e. under-focussed or over-focussed and to what extent. This focussing control signal is transmitted to the servomechanism, which moves the objective lens closer to the optical disc when the light beam is over-focussed, and away from the disc when the light beam is under-focussed.

In this type of focussing error detecting apparatus, various devices have been proposed for directing the reflected light beam onto the separate sections of the photodetector. These devices include, for example, prisms and/or lenses. In these devices, different portions of the reflected light beam pass through different sections of the prism or lens to fall onto the separate sections of the photodetector. Each individual portion of the light beam is therefore affected differently depending on the geometry of the section of the prism or lens through which it passes, e.g. it may be weakened or diffracted. In the various types of devices proposed for this purpose, there has been difficulty in achieving the desired precision and linearity required for highly accurate control of the motion of the objective lens.

OBJECTS AND SUMMARY OF THE INVENTION

Accordingly, it is an object of this invention to provide a focussing error detecting apparatus which can obviate the defects inherent in the prior art focussing error detecting apparatus.

Another object of this invention is to provide a focussing error detecting apparatus capable of producing a focussing error signal of high precision and excellent linearity.

A further object of this invention is to provide a focussing error detecting apparatus suitable for use with an optical disc reproducing device, an auto-focus camera or image pickup device, or the like.

According to an aspect of this invention, there is provided a focussing error detecting apparatus comprising a compound lens and a photodetector provided behind the compound lens so as to oppose it, wherein the compound lens consists of first and second lens regions separated by a boundary plane which includes an optical axis of a beam of light incident on the compound lens, the first and second lens regions having back focal lengths which are different from each other, and the optical axes of the first and second lens regions being spaced apart from each other. The photodetector has its photodetecting face positioned at a middle position on the optical axis of the incident light beam between the focal points of the portions of light passed separately from each of the pair of lens regions when the incident light on said compound lens is just-focussed. The photodetector comprises first and second photodetecting elements for receiving the portions of light which are passed through the first lens region at its outer and inner sections with respect to the boundary plane and third and fourth photodetecting elements for receiving the portions of light which are passed through the second lens region at its outer and inner sections with respect to the boundary plane, wherein a focussing error signal is produced from a difference between a sum of first and fourth photodetecting signals from said first and fourth photodetecting elements and a sum of second and third photodetecting signals from said second and third photodetecting elements.

The above, and other objects, features and advantages of the present invention, will become apparent from the following description taken in conjunction with the accompanying drawings, throughout which like references designate like elements.

BRIEF DESCRIPTION OF THE DRAWINGS

FIGS. 7A, 7B and 7C are schematic views illustrating the operation of the apparatus of FIG. 4 in its under-focussed, just-focussed and over-focussed states, respectively;

FIG. 8 is a plot of the focus error signal versus distance for the apparatus shown in FIG. 4;

DETAILED DESCRIPTION OF PREVIOUSLY PROPOSED APPARATUS

Figure 1:
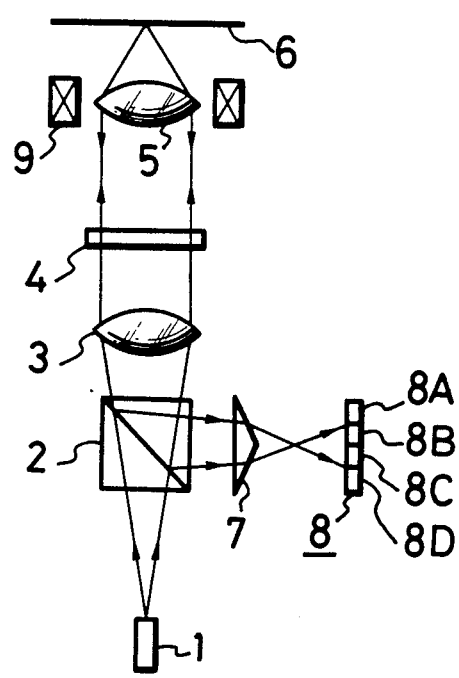
FIG. 1 is a schematic view illustrating a first previously proposed focussing error detecting apparatus.

Various focussing error detecting apparatus have been proposed for use with an optical disc reproducing apparatus and will be described hereinafter to facilitate an understanding of the novel aspects of this invention. One such previously proposed apparatus disclosed in Japanese unexamined patent publication No. 56-13532, for use as a device which can simplify an optical system for detecting a focussing error, is shown in FIG. 1. This apparatus employs the combination of a Foucault prism with a photodetector consisting of four photodetecting elements which are arranged in the same plane.

In the apparatus of FIG. 1, a laser light beam emitted from a laser light source 1, for example a semiconductor laser light source, passes sequentially through a polarizing beam splitter 2, a collimator lens 3, a ¼ wavelength plate 4 and an objective lens 5 and onto a record surface 6 of an optical disc. On the record surface 6 of the optical disc modulated audio and/or video information is recorded in circular or spiral tracks in the form of depressions, e.g. pits, or ridges. This audio or video information may be reproduced optically through the modulation of the incident light beam by the pits. The laser light thus modulated to contain the recorded information is reflected by the record surface 6 and passes sequentially through objective lens 5, ¼ wavelength plate 4, collimator lens 3, polarizing beam splitter 2 and a Foucault prism 7 to a photodetector 8.

Figure 2:
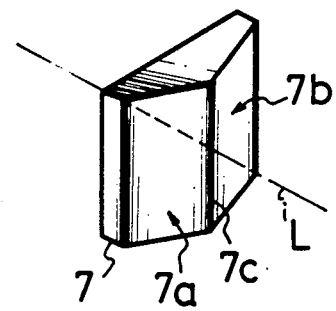
FIG. 2 is a perspective view of a prism used in the focussing error detecting apparatus of FIG. 1.

Prism 7 includes a refractive surface which consists of two rectangular refractive faces 7a and 7b intersecting at an obtuse angle, as shown in FIG. 2. Prism 7 is so positioned that refractive faces 7a and 7b are located at the side of prism 7 facing photodetector 8 (see FIG. 1), and the edge line 7c between faces 7a and 7b is oriented perpendicular to an optical axis L of the incident laser light.

Figure 3A:
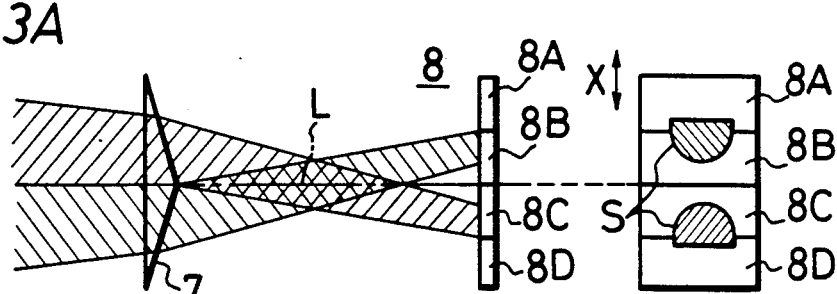
FIGS. 3A, 3B and 3C are schematic views illustrating the operation of the apparatus of FIG. 1 in its under-focussed, just-focussed and over-focussed states, respectively.
Figure 3B:
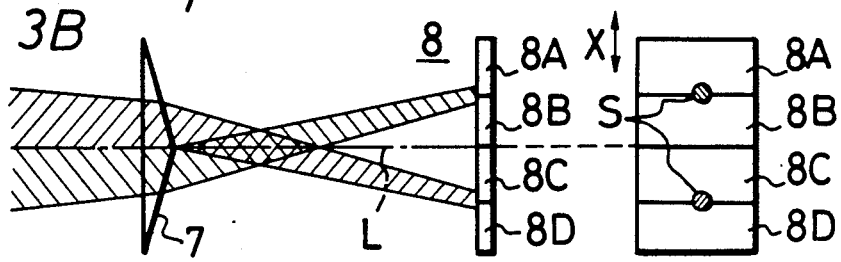
Figure 3C:
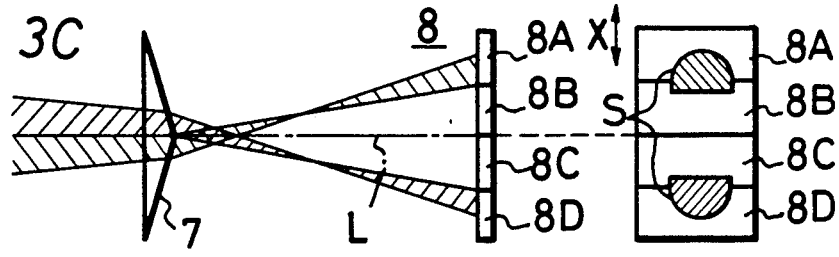

The photodetector 8 comprises, as shown in FIGS. 1 and 3A-3C, four photodetecting elements 8A, 8B, 8C and 8D, the photodetecting faces of which lie in a plane perpendicular to the optical axis L and are arranged along the X-direction, as indicted by the arrows in FIGS. 3A-3C, perpendicular to both the optical axis L and edge line 7c. A focussing error signal is derived as the difference between a sum signal $S_A+S_D$ of photodetecting signals $S_A$ and $S_D$ from outside photodetecting elements 8A and 8D and a sum signal $S_B+S_C$ of photodetecting signals $S_B$ and $SC_C$ from inside photodetecting elements $S_B$ and $S_C$, i.e. the focussing error or difference signal is $(S_A+S_D)-(S_B+S_C)$.

Objective lens 5 can be moved along the optical axis in response to the current flowing through a control coil 9 (FIG. 1). The focussing error signal derived in the manner indicated above is supplied to the control coil 9 as a focussing control signal.

In this previously proposed apparatus, when the record surface 6 of the optical disc is placed at the proper position relative to objective lens 5 and a just-focussed state is established, as shown in FIG. 3B, the laser light passed through the prism 7 onto the photodetector 8 appears as two dots or beam spots S of substantially the same size on the zones between the elements 8A, 8B and 8C, 8D, respectively. Accordingly, in this case, the focussing error signal becomes zero and hence the objective lens 5 is maintained at that position.

When the objective lens 5 is positioned too close to the record surface 6 of the optical disc, and an underfocussed state exists, as shown in FIG. 3A, the spots S on the photodetector 8 appear as respective semi-circles located mainly on the inside elements 8B and 8C. In this case, the focussing error signal becomes negative and the objective lens 5 is moved in the direction away from the record surface 6.

When the objective lens 5 is positioned too far from the record surface 6 and an over-focussed state exists, as shown in FIG. 3C, the spots S on the photodetector 8 appear as respective semi-circles located mainly on the outside elements 8A and 8D so that the focussing error signal becomes positive, and the objective lens 5 is then moved in the direction closer to the record surface 6.

As described above, the prism 7 and the photodetector 8 comprising the four photodetecting elements 8A to 8D which are arranged along the same line detect the focussing error or equivalently the distance between the record surface 6 of the disc and the objective lens 5. The focussing error signal generated thereby is supplied to the control coil 9 as the focussing control signal by which the focussing operation is automatically controlled so as to maintain the just-focussed state, i.e. to keep the objective lens 5 at a constant distance relative to the record surface 6 of the disc.

However, this previously proposed apparatus has a defect in that, in order to locate the spot S on the photodetector 8 for the respective focussing states as shown in FIGS. 3A to 3C, the photodetector 8 must be located at the precise position with respect to the direction of optical axis L and the X-direction, requiring severe precision in the positioning of the photodetector 8. Another difficulty is that the prism 7 suffers from light loss at its apical angle. Since the apical angle forms the edge line 7c, the loss of light is significant. Thus, in order to reduce such loss of light, it is necessary to enhance the precision in finishing the apical angle of the prism 7.

Figure 4:
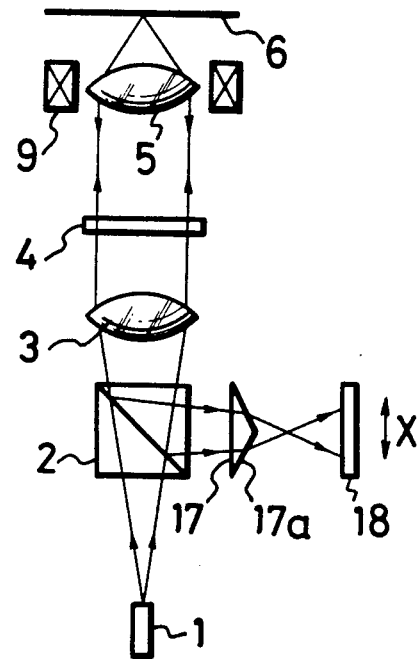
FIG. 4 is a schematic view illustrating a second previously proposed focussing error detecting apparatus.
Figures 5A, 5B:
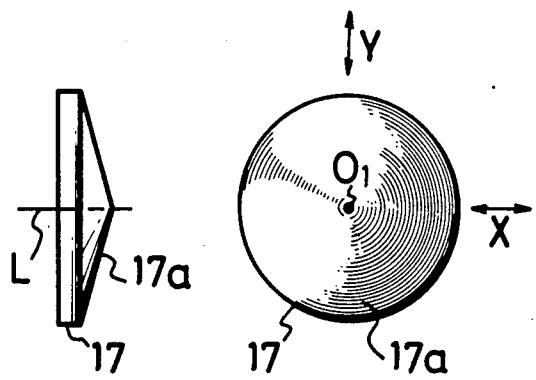
FIGS. 5A and 5B are respectively side and front views of a lens used in the apparatus of FIG. 4.
Figure 6:
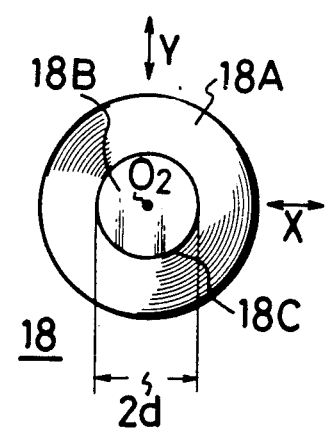
FIG. 6 is a schematic view illustrating an arrangement of a photodetector used in the apparatus of FIG. 4.

A second previously proposed focussing error detecting apparatus for obviating the aforesaid defects is disclosed in Japanese unexamined utility model publication No. 54-84957 and will now be described with reference to FIG. 4 in which a lens 17a having a conical refractive face replaces the prism 7 of FIGS. 1 to 3. In FIG. 4, as in the remaining Figures, like elements are given like numerals, and repeated detailed description of the common elements will not be given, in the interest of brevity. In this example, in the light path from the polarizing beam splitter 2 to a photodetector 18 which may be, for example, a PIN photodiode, there is placed the lens 17 having conical refractive face 17a, with the refractive face 17a located at the side facing the photodetector 18. In this case, as shown in FIGS. 5A and 5B, the center $O_1$ of the lens 17 is positioned on the optical axis L. Further, as shown in FIG. 6, the photodetector 18 is formed of two concentric circular photodetecting elements 18A and 18B, and their common center $O_2$ is also positioned on the optical axis L.

In this apparatus, as shown in FIGS. 7A-7C, the base or bottom angle of the lens 17 may be designated as $\theta$ and a radius of a dead zone (i.e. a zone of separation) 18C between the elements 18A and 18B of the photodetector 18 may be designated as d. Then, in order that the light beam which passes through the lens 17 at its portion very close to the optical axis L may reach the dead zone 18C between the elements 18A and 18B, a distance l between the lens 17 and the photodetector 18 must be selected to satisfy the relationship $l = d \cot \beta$ where $\beta$ is an angle obtained from $\sin(\beta + \theta) = n \sin \theta$, where and n is the refractive index of glass forming the lens 17.

A difference signal $S_A - S_B$ between photodetecting signals $S_A$ and $S_B$ from the elements 18A and 18B is derived as a focussing error signal. This focussing error signal is supplied to the control coil 9 shown in FIG. 4 as a focussing control signal.

In this apparatus, when the record surface 6 of the disc is at a proper distance relative to the objective lens 5 so as to establish the just-focussed state, as shown in FIG. 7B, the spot S of the laser light on the photodetector 18 appears as a ring on the dead zone 18C between the elements 18A and 18B. Accordingly, in this case, the focussing error signal is zero and the objective lens 5 is maintained at this position.

When the objective lens 5 is positioned too close to the record surface 6 so as to establish the underfocussed state, as shown in FIG. 7A, the spot S on the photodetector 18 appears as a ring falling entirely or for the most part on the inside element 18B, so that the focussing error signal is negative and the objective lens 5 is moved away from the record surface 6.

When the objective lens 5 is positioned too far from the record surface 6, so that the over-focussed state exists, as shown in FIG. 7C, the spot S on the photodetector 18 appears as a ring falling entirely or for the most part on the outside element 18A so that the focussing error signal is positive and the objective lens 5 is moved closer to the record surface 6.

In this way, the combination of the lens 17 having the conical refractive face 17a and the photodetector 18 which comprises the two concentric photodetecting elements 18A and 18B detects the focussing state or equivalently the distance between the record surface 6 of the disc and the objective lens 5. This focussing error signal is supplied to the control coil 9 as the focussing control signal by which the focussing control operation is automatically carried out so as to maintain the just-focussed state, i.e. to keep the objective lens 5 at a constant distance relative to the record surface 6 of the disc at all times. With this proposed apparatus shown in FIG. 4, the alignment of the photodetector 18 becomes easy and simple.

The prior art apparatus in FIG. 1 uses the prism 7 which has the refractive face formed of the two rectangular faces 7a and 7b and the photodetector 8 formed of four photodetecting elements 8A to 8D arranged in the same direction. Therefore, in the respective focussing states shown in FIGS. 3A or 3C, the spots S appear as respective semi-circles on the inside elements 8B and 8C or the outside elements 8A and 8D. The part of each of the spots S which is near the dead zone between the elements 8A and 8B, or the dead zone between the elements 8C and 8D, is respectively formed not only of the weak laser light passed through the portion of the prism 7 close to its center, but also of the strong laser light passed through the portion of the prism 7 distant from its center. Thus, the intensity of light at this part of the spot S is relatively increased. For this reason, when the photodetector 8 is displaced in position along the optical axis L or the X-direction in FIGS. 3A or 3C, so that the spot S lies across the outside elements 8A and 8D or the inside elements 8B and 8C, the focussing error signal has large variations in value as compared with its value when the photodetector 8 is in the precisely correct position, so that erroneous focussing error detection may be performed, i.e. there may be overcompensation. Thus, severe precision is required in adjusting the position of the photodetector 8 in the optical axis direction and the X-direction.

Meanwhile, the apparatus in FIG. 4 employs the lens 17 having the conical refractive face 17a which is combined with the photodetector 18 formed of the two concentric photodetecting elements 18A and 18B. Consequently, in FIGS. 7A or 7C, the spot S appears as the respective rings on the inside element 18B or the outside element 18A. That part of the spot S which lies near the dead zone 18c between the elements 18A and 18B is formed of the weak light passed through the portion of lens 17 close to its center, and hence the intensity of light near the dead zone 18c is reduced, while on the other hand the part of the spot S which lies away from the dead zone 18c is formed of only the intense light passed through the portion of the lens 17 which is distant from its center and accordingly the intensity of light away from the dead zone 18c is increased. In other words, the intensity of light forming the spot S in the under-focussed state of FIG. 8A, decreases in the direction towards the dead zone 18c, i.e. at the outer portion of the spot S, while the light intensity increases in the inner portion. In the over-focussed state of FIG. 7C, the light intensity again decreases in the direction towards the dead zone 18c, but in this case this direction is towards the inner portion of the spot S while the intensity increases towards the outer portion of the spot S. Accordingly, when the position of the photodetector 18 is displaced somewhat along the optical axis direction or the X and Y directions as shown in FIGS. 7A or 7C, and the spot S overlaps to a small extent the outside element 18A or the inside element 18B, instead of lying totally within one or the other and the dead zone, the focussing error signal does not fluctuate a great deal in value as compared with its value when the photodetector 18 is accurately positioned, so that erroneous detection will not occur. Thus, it is not necessary that the position of the photodetector 18 in the optical axis direction and the X, Y directions be adjusted so precisely as in the apparatus of FIG. 1.

According to the apparatus shown in FIG. 4, since the light intensity of the spot S decreases at its portion closer to the separation zone and increases at its portion away from the dead zone, and as the more the focussing state is displaced from the just-focussed state, the more the spot S is widened in the direction away from the separation zone 18c, then the sensitivity in detection is increased remarkably.

Although the lens 17 suffers from loss of light at its apical portion, its apical portion is not formed of an edge line as in the prior art prism 7 but of a point, so that the loss of light is relatively small. Thus, it is not necessary to improve the precision in finishing the apical angle for the purpose of reducing the loss of light.

However, the apparatus shown in FIG. 4 has the following defects. Since the focussing error signal is formed from the difference between the signals created in response to the light intensities of the spot S on the photodetecting face of the photodetector 18 at its central and peripheral portions, this focussing error signal contains a leaked high frequency signal component due to the diffraction of the light from the pits on the optical disc. In addition, the characteristic of the modulation of the light by the pits corresponding to spatial frequency is different between the central and external peripheral portions of the spot S. Therefore the focussing error signal obtained from the apparatus in FIG. 4 is not highly precise.

Furthermore, in the apparatus in FIG. 4, the change in the radius of the spot S on the photodetector 18 is detected from the change in the area of the spot S, and so the characteristic relationship of a defocussing amount vs. the focussing error signal is in inverse proportion to the square of the radius of the spot S. At positions close to the just-focussed state, this results in a highly non-linear relationship.

The apparatus of FIG. 1 suffers from the same defects just discussed with respect to the apparatus shown in FIG. 4.

One other focussing error detecting apparatus has been proposed, for example, as disclosed in U.S. Pat. No. 4,023,033, in which the photodetecting face of a photodetector is circular, the photodetecting face is divided into four equal parts so as to form photodetecting elements in four quadrants, a semi-columnar lens is placed in front of the photodetector, and the focussing error signal is generated from the difference between the sum of photodetecting signals from the photodetecting elements in the first and third quadrants and the sum of photodetecting signals from the photodetecting elements in the second and fourth quadrants.

Such previously proposed focussing error detecting apparatus will hereinafter be described with reference to FIGS. 9–14 of the drawings, wherein like elements receive like identifying numerals.

Figure 9:
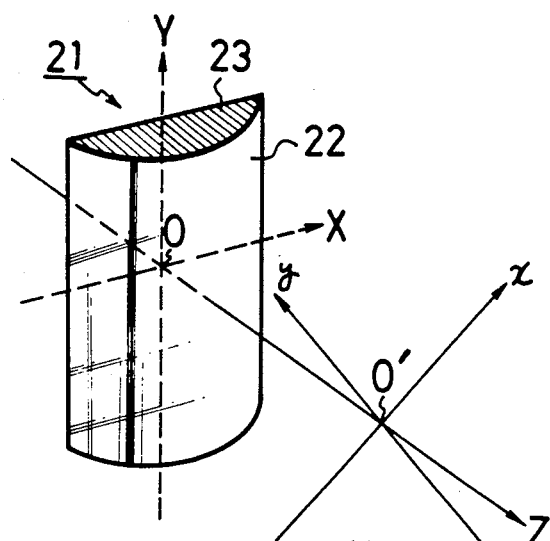
FIG. 9 is a perspective view illustrating a semi-columnar lens used in a third example of a previously proposed focussing error detecting apparatus.

FIG. 9 schematically illustrates a semi-columnar lens 21 which comprises a semi-columnar face 22 and a rectangular back flat plane 23. The center of flat plane 23 is taken as an origin O and a first orthogonal coordinate system is defined which consists of an X-axis parallel to a generatrix of the semi-columnar face 22, a Y-axis perpendicular thereto and a Z-axis perpendicular to the flat plane 23. On the Z-axis, a point spaced at a predetermined distance from the origin O at the flat plane 23 of the semi-columnar face 22 of the lens 21 is taken as an origin O' and a second orthogonal coordinate is defined within the plane perpendicular to the Z-axis which comprises an x-axis at an angle of 45° with respect to the positive X- and Y-axes, and a y-axis perpendicular to the x-axis. The circular detecting face of the photodetector coincides with the x-y plane and the detecting face is divided by the x- and y-axes into four equal parts, so that the photodetector is divided into the photodetecting elements of four quadrants.

Figure 10:
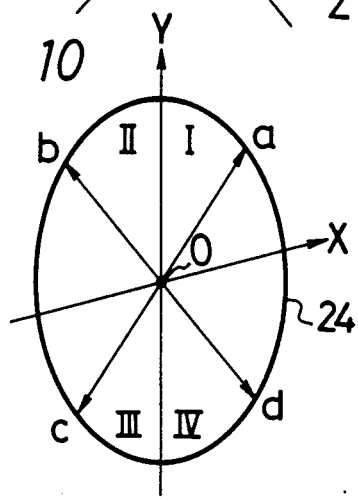
FIG. 10 is a perspective view showing a beam spot created by the lens of FIG. 9.

The lens 21 is adapted to receive on its flat plane 23 a focussing beam, the optical axis of which is coincident with the Z-axis and which beam lands on the flat plane 23 at a circular spot 24, as shown in perspective view in FIG. 10. Axes a, b, c, and d lying along radii of the circular spot 24, each axis forming the angle of 45° against the X- and Y-axes, are located at the first to fourth quadrants I to IV.

Figure 11:
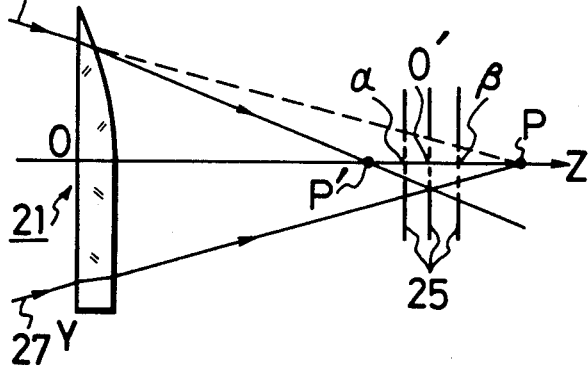
FIG. 11 is a schematic view illustrating focal points of light beams which are incident on the semi-columnar lens in FIG. 9.

FIG. 11 illustrates the loci formed by light beams 26 and 27 in XOZ and YOZ cross-sections of the lens 21 when the focussing beam is incident on the flat plane 23 of lens 21. Since the YOZ cross-section is uniform in thickness, the light beam 27 incident on the YOZ cross-section of the lens 21 advances in parallel to the incident light and passes through a point P on the Z-axis. On the other hand, the light beam 26 incident on the XOZ cross-section of the lens 21 is refracted towards Z-axis, since the XOZ cross-section forms a convex lens, and passes through a point P' which is before the point P on the Z-axis.

Figure 12:
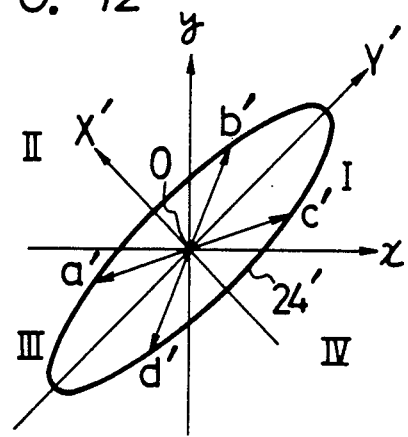
FIGS. 12, 13 and 14 are respectively schematic views of beam spots created by the lens of FIG. 9.
Figure 13:
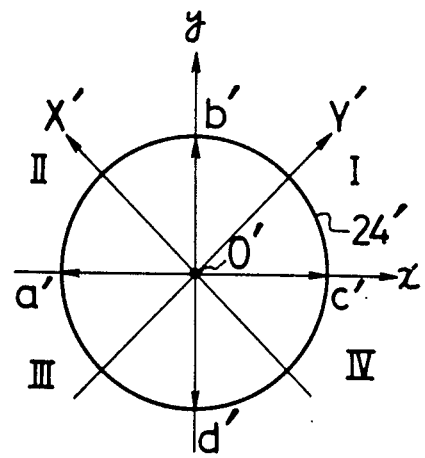
Figure 14:
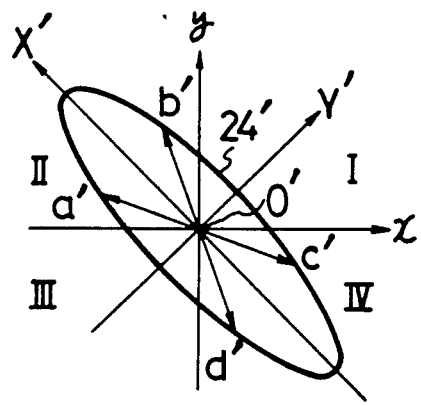

In FIG. 11, it is assumed that when the detecting face 25 of the photodetector is positioned at the middle point O' between the points P and P', as defined in connection with FIG. 9, and a spot 24' of the irradiated beam on the detecting face 25 is circular as shown in FIG. 13, the focussing light beam from the objective lens is just-focussed on the record surface of the optical disc. Thus, the fact that the focussing light beam from the objective lens is focussed before or behind the optical disc is equivalent to the fact that the position of the detecting face 25 of the photodetector is displaced to the point before the point O' or behind the point O', which allows the spot 24' on the detecting face 25 of the photodetector to become an ellipse as shown in FIGS. 12 and 14, respectively. That is, the elliptical spot 24' in FIG. 12 has its major axis angled at 45° relative to the x-axis in the first and third quadrants I and III, while the elliptical spot 24' in FIG. 14 has its major axis angled at 45° relative to the x-axis in the second and fourth quadrants II and IV. Throughout FIGS. 12 to 14, the axes a' to d' correspond to the axes a to d, respectively, in FIG. 10.

With this arrangement, assuming the detecting face 25 of the photodetector is larger than the spot 24', the focussing state of the objective lens relative to the optical disc is detected by the difference between the sum of the signals from the photodetecting elements in the first and third quadrants I and III and that of the photodetecting signals from the elements in the second and fourth quadrants II and IV. Thus, if the objective lens is moved along the optical axis so as to reduce this difference to zero, the focussing operation can be performed.

However, in the focussing error signal detecting apparatus comprising the semi-columnar lens 21 combined with the photodetector which is divided into four equal parts, when the position of the spot 24' on the photodetecting face 25 of the photodetector is displaced from the states shown in FIGS. 12 to 14 in the X'- or Y'-axis direction, the precision of the focussing error signal is degraded in proportion to the amount of such displacement.

DESCRIPTION OF THE PREFERRED EMBODIMENTS

Embodiments of a focussing error detecting apparatus according to the present invention will now be described with reference to the drawings.

Figure 15:
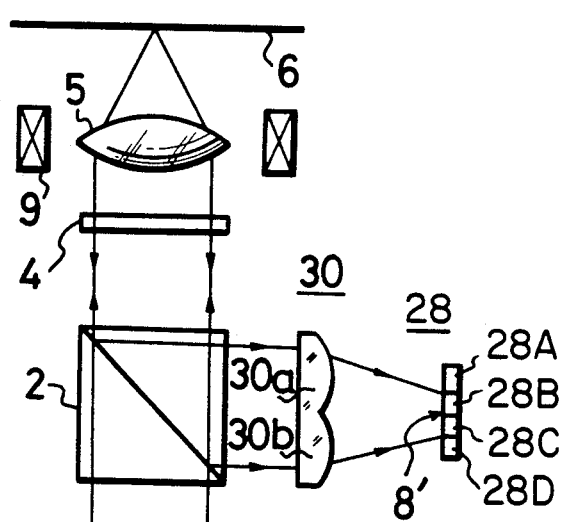
FIG. 15 is a schematic view illustrating a first embodiment of focussing error detecting apparatus according to the present invention.

FIG. 15 schematically illustrates a first embodiment of a focussing error detecting apparatus according to the present invention which is suitable for use in an optical disc reproducing apparatus.

In FIG. 15, laser light from the laser light source 1, which may be, for example, a semiconductor laser light source, passes sequentially through collimator lens 3, polarizing beam splitter 2, ¼-wavelength plate 4 and objective lens 5 to the record surface 6 of the optical disc. On the record surface 6 of the disc, modulated audio and/or video information is recorded in circular or spiral tracks of pits, from which the information can be reproduced optically. The resulting modulated laser light reflected from the record surface 6 passes sequentially through the objective lens 5, ¼ wavelength plate 4, polarizing beam splitter 2 and a compound lens 30 to the photodetector 28.

Figure 16:
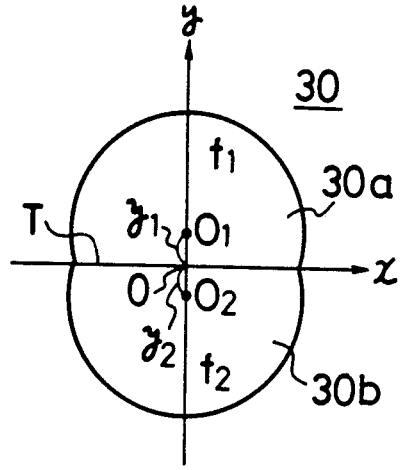
FIG. 16 is a plan view of a compound lens used in the apparatus of FIG. 15.
Figure 18:
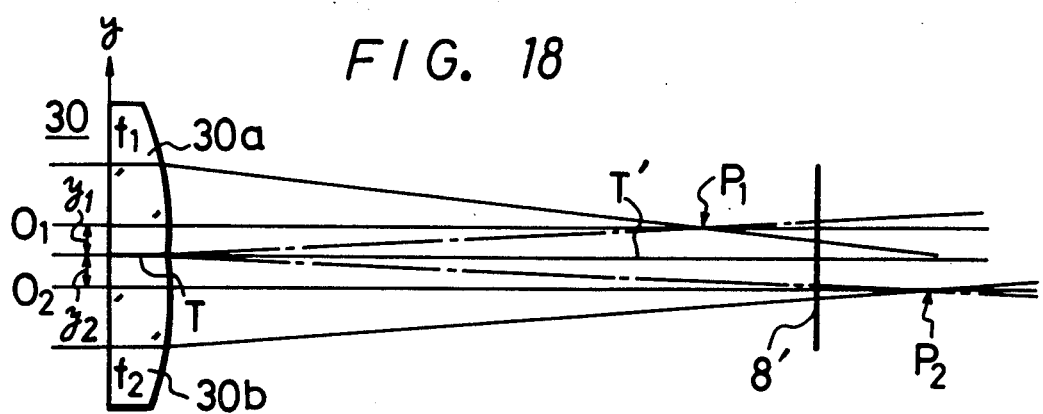
FIG. 18 is a schematic view illustrating the physical relationship between the compound lens and the photodetector used in the apparatus shown in FIG. 15.

The compound lens 30 of the embodiment of FIG. 15 consists of first and second convex lens regions 30a and 30b which are separated by a boundary plane T including the optical axis O of the light incident on the compound lens 30, as shown in FIGS. 16 and 18. The lens regions 30a and 30b have back-focal lengths $f_1$ and $f_2$ which are different from each other. Optical axes $O_1$ and $O_2$ of the first and second lens regions 30a and 30b are spaced apart from each other. In the arrangement of FIG. 16, the compound lens 30 is placed in the x-y plane perpendicular to the optical axis O of the incident light, and the boundary plane T is coincident with the x-axis. The optical axes $O_1$ and $O_2$ of the lens regions 30a and 30b are positioned on the y-axis so as to be spaced from the boundary plane T by distances $y_1$ and $y_2$, respectively.

The compound lens 30 may be formed in such a fashion that the lens regions 30a and 30b are made individually of glass, plastic or similar materials and then bonded together, or the compound lens 30 may be formed in an integral molding step from, e.g. plastic.

Figure 17A:
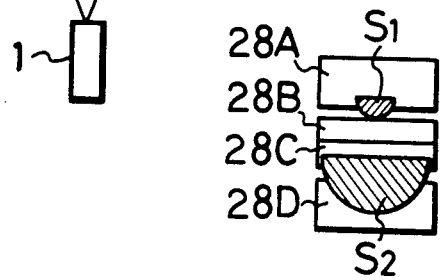
FIGS. 17A, 17B and 17C are plan views illustrating the images on a photodetector used in the apparatus in FIG. 15 in the under-focussed, just-focussed and over-focussed states, respectively.
Figure 17B:
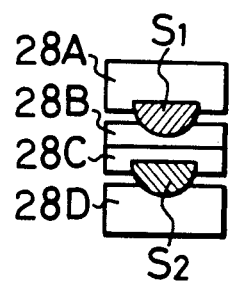
Figure 17C:
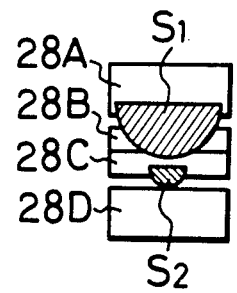

As shown in FIG. 18, the photodetector 28 is positioned in such a manner that when the light incident on the compound lens 30 is focussed or parallel light, the photodetecting face 8' is located midway between converging focal points P and $P_2$ positioned on the optical axes $O_1$ and $O_2$ on either side respectively of the plane T' extended from the boundary plane T on the optical axis O. As shown in FIGS. 17A-17C, the photodetector 28 includes first and second photodetecting elements 28B and 28A for receiving the light which has passed through respective sections of the first lens region 30a which are outer and inner with respect to the boundary plane T, and third and fourth photodetecting elements 28D and 28C for receiving the light which has passed through the outer and inner sections, respectively, of the second lens region 30b, also considered with respect to the boundary plane T. The first, second, third and fourth photodetecting elements 28B, 28A, 28D and 28C, respectively, are each rectangular and arranged in the order 28A, 28B, 28C and 28D in a single direction, for example, the direction along the track at the location on the record surface of the disc where the laser beam scans the latter. In this case, the photodetecting elements 28B and 28C can be formed integrally.

Figure 20:
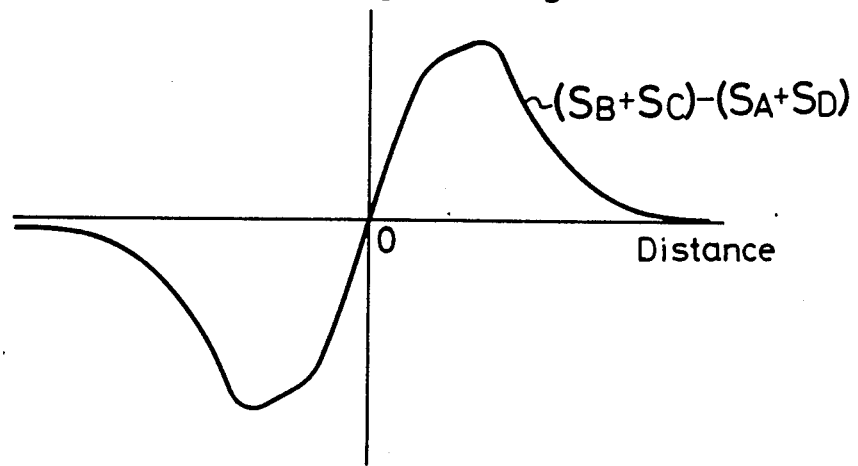
FIG. 20 is a plot of the focus error signal versus distance for the apparatus of FIG. 15.

A difference between a sum $S_B+S_C$ of the first and fourth photodetecting signals $S_B$ and $S_C$ from the first and fourth photodetecting elements 8B and 8C and a sum $S_A+S_D$ of the second and third photodetecting signals $S_A$ and $S_D$ from the second and third photodetecting elements 28A and 28D, namely $(S_B+S_C)-(S_A+S_D)$, is produced as a focussing error signal, and is plotted in FIG. 20. This focussing error signal is supplied to the control coil 9 as a focussing control signal.

The operation of the focussing error detecting apparatus according to embodiment of the present invention shown in FIG. 15 will now be described with reference to FIGS. 17A-17C. When the record surface 6 of the disc is at a proper position relative to the objective lens 5 to establish the just-focussed state, the light incident on the compound lens 30 is parallel and, as shown in FIG. 17B, forms spots $S_1$ and $S_2$ on the photodetector 28 appearing as semi-circles of the same size and with the same orientation on the photodetecting elements 28A, 28B and 28C, 28D, respectively. Accordingly, in this case, the focussing error signal is zero and the objective lens 5 remains at the original position.

Figure 19:
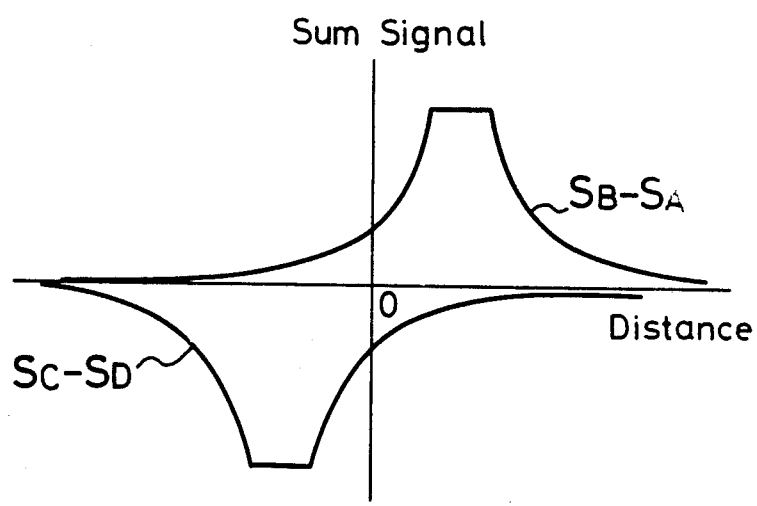
FIGS. 19 is a plot of the signals $S_B-S_A$ and $S_C-S_D$ versus distance for the apparatus of FIG. 15.

When the objective lens 5 is positioned too close to the record surface 6 and the under-focussed state is established, the incident light on the compound lens 30 is displaced from the parallel in one direction so that, as shown in FIG. 17A, the spots $S_1$ and $S_2$ on the photodetector 28 appear as a small semi-circle on the elements 28A and 28B and a large semi-circle on the elements 28C and 28D, respectively, with the same orientation. Further, the area of the spot $S_2$ on element 28D is substantially larger than the area of that spot on element 28C, that is, the difference signal $S_C-S_D$ has an increased negative value, as shown on FIG. 19. Accordingly, in this case, the focussing error signal is negative, as shown on FIG. 20, and the objective lens 5 is moved away from the record surface 6.

When the objective lens 5 is too far away from the record face 5 and the over-focussed state is established, the incident light on the compound lens 30 is displaced from the parallel in the opposite direction so that, as shown in FIG. 17C, the spots $S_1$ and $S_2$ on the photodetector 28 appear as a large semi-circle on the elements 28A and 28B and a small semi-circle on the elements 28C and 28D respectively, with the same orientation. As shown, the area of the spot $S_1$ on element 28B is substantially larger than the area of spot $S_1$ on element 28A, that is, the difference signal $S_B-S_A$ has an increased positive value, as shown on FIG. 19. Accordingly, in this last case, the focussing error signal is positive, as shown on FIG. 20, and the objective lens 5 is moved closer to the record surface 6.

As set forth above, the combination of the compound lens 30 and the photodetector 28 which comprises four photodetecting elements 28A to 28D arranged in one direction detects the focussing error, or equivalently the distance between the record surface 6 of the disc and the objective lens 5. This focussing error signal is supplied to the control coil 9 as the focussing control signal by which the objective lens 5 is automatically controlled in position so as to maintain the just-focussed state, i.e. to keep the objective lens 5 at a constant distance relative to the record surface 6 of the disc at all times.

A second embodiment of this invention will now be described with reference to FIG. 21 in which the compound lens $30_1$ consists of first and second concave lens regions $30_{1a}$ and $30_{1b}$.

Figure 21:
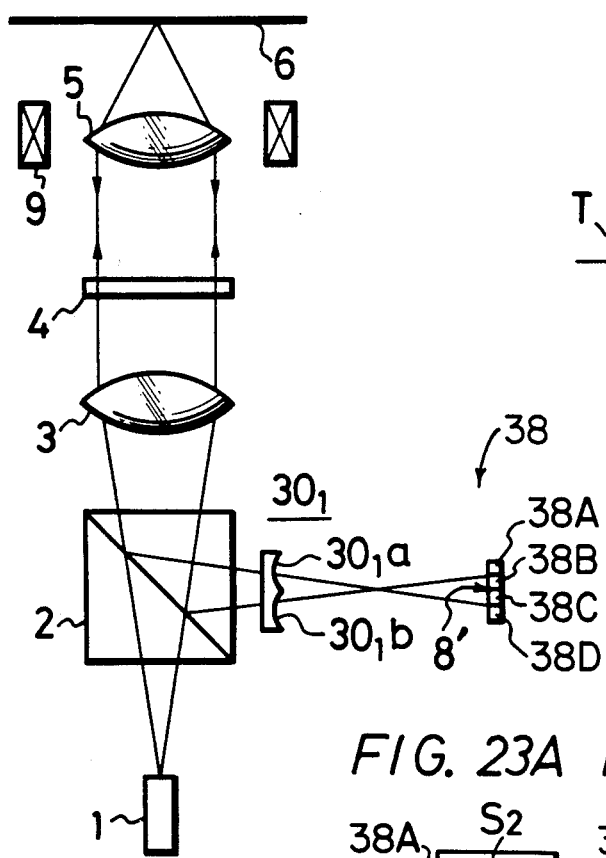
FIG. 21 is a schematic view illustrating a second embodiment of a focussing error detecting apparatus according to the present invention.

In the case of FIG. 21, as in the previous case in FIG. 15, laser light from the laser light source 1, which may be, for example, a semiconductor laser light source, passes sequentially through polarizing beam splitter 2, collimator lens 3, ¼ wavelength plate 4 and objective lens 5 to the record surface 6 of the disc in an optical reproducing apparatus. The laser light reflected from the record surface 6 passes through the objective lens 5, the ¼-wavelength plate 4, the collimator lens 3, the polarizing beam splitter 2 and the compound lens 30 in this order to a photodetector 38.

Figure 22:
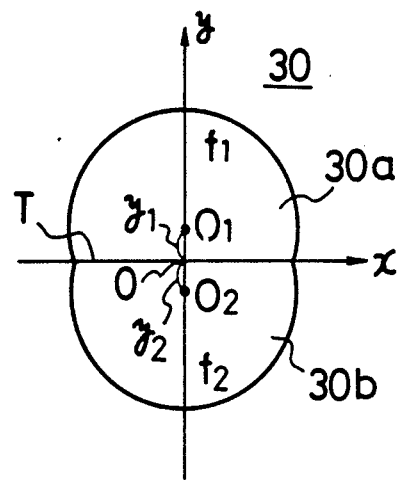
FIG. 22 is a plan view illustrating a compound lens used in the apparatus shown in FIG. 21.
Figure 24:
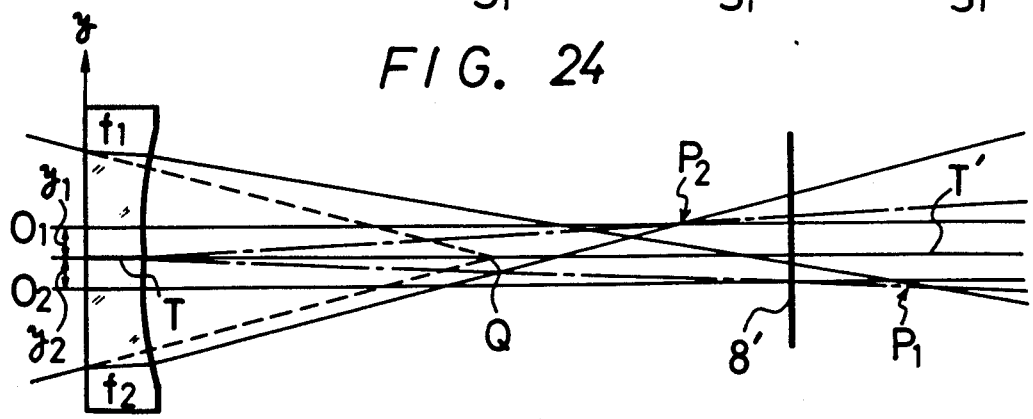
FIGS. 24 is a schematic view illustrating the physical relationship between the compound lens and the photodetector used in the apparatus shown in FIG. 21.

This compound lens $30_1$, as earlier noted, consists of first and second concave lens regions $30_{1a}$ and $30_{1b}$ which are separated by the boundary plane T including the optical axis O of the light incident on the compound lens $30_1$, as shown in FIGS. 22 and 24. The first and second lens regions $30_{1a}$ and $30_{1b}$ have back focal lengths $f_1$ and $f_2$ which are different from each other. Optical $O_1$ and $O_2$ of the lens regions $30_{1a}$ and $30_{1b}$ and are spaced apart from each other. As shown in FIG. 22, the compound lens $30_1$ is placed on the x-y plane perpendicular to the optical axis O of the incident light, and the boundary plane T is made coincident with the x-axis. The optical axes $O_1$ and $O_2$ of the lens regions $30_{1a}$ and $30_{1b}$ are positioned on the y-axis on opposite sides of the boundary plane T and spaced from the latter by distances $y_1$ and $y_2$ respectively.

As shown in FIG. 24, the photodetector 8 is positioned in such a manner that, when the light incident on the compound lens $30_1$ is in a convergent state or is focussing toward a virtual object at point Q, the photodetecting face 8' of the photodetector 38 is positioned midway between converging focal points $P_1$ and $P_2$ positioned on the optical axes $O_1$ and $O_2$ at opposite sides of the plane T' extended from the boundary plane T on the optical axis O. As shown on FIGS. 23A–23C, the photodetector 38 consists of first and second photodetecting elements 38C and 38D for receiving the light which has passed through the outer and inner sections, respectively, of the first lens region $30_{1a}$ with respect to the boundary plane T, and third and fourth photodetecting elements 38A and 38B for receiving the light which has passed through the outer and inner sections of the second lens region $30_{1b}$ with respect to the boundary plane T. The photodetecting elements 38A, 38B, 38C and 38D are each rectangular and arranged in order in that one direction, for example, the direction along the track at the location on the record surface of the disc where the laser beam scans the latter. In this case also, the photodetecting elements 38B and 38C can be formed integrally.

As in the embodiment shown in FIG. 15, the focussing error signal for the present embodiment is produced from a difference between a sum $S_C+S_B$ of the first and fourth photodetecting signals $S_C$ and $S_B$ from the first and fourth photodetecting elements 38C and 38B and a sum $S_D+S_A$ of the second and third photodetecting signals $S_D$ and $S_A$ from the second and third photodetecting elements 38D and 38A. However, for this embodiment, the focussing error signal is given by $(S_A+S_D)-(S_C+S_B)$, that is, the negative of the signal of the embodiment of FIG. 15. This focussing error signal is supplied to the control coil 9 as a focussing control signal.

Figures 23A, 23B, 23C:
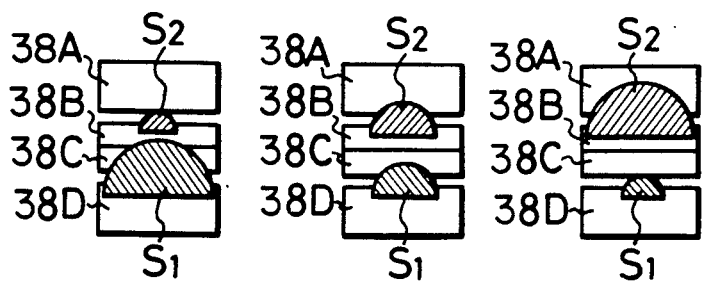
FIGS. 23A to 23C are plan views illustrating the images on the photodetector used in the apparatus shown in FIG. 21 in the under-focussed, just-focussed and over-focussed states, respectively.

The operation of the focussing error detecting apparatus according to the embodiment of the invention shown in FIG. 21 will be described with reference to FIGS. 23A–23C. When the record surface 6 of the disc is at a proper position relative to the objective lens 5 to establish the just-focussed state, the focussing light which will be conducted to the virtual object at point Q is incident on the compound lens $30_1$ such that, as shown in FIG. 23B, the spots $S_1$ and $S_2$ on the photodetector 38 appear as semi-circles of the same size and with the same orientation on the photodetecting elements 38C, 38D and 38A, 38B, respectively. Accordingly, in this case, the focussing error signal is zero and the objective lens 5 remains at the original position.

When the objective lens 5 is positioned too close to the record surface 6 and the under-focussed state is established, the incident light on the compound lens 30 is displaced somewhat from that in the just-focussed state in one direction so that, as shown in FIG. 23A, the spots $S_1$ and $S_2$ on the photodetector 8 appear as a large semi-circle on the elements 38C and 38D and a small semi-circle on the elements 38A and 38B, with the same orientation. Further, the area of the spot $S_1$ on the element 38C is substantially larger than the area of that spot on element 38D, that is, the difference signal $S_D-S_C$ has an increased negative value. Due to the reversed orientation of the spots in FIGS. 17A and 23A, this difference signal may be visualized as the equivalent of the difference signal $S_C-S_D$ of FIG. 19. Accordingly, in this case, the focussing error signal is negative and the objective lens 5 is moved away from the record surface 6.

When the objective lens 5 is too far from the record surface 6 and the over-focussed state is established, the incident light on the compound lens 30 is displaced somewhat from that in the just-focussed state in the opposite direction so that, as shown in FIG. 23C, the spots $S_1$ and $S_2$ on the photodetector 8 appear as a small semi-circle on the elements 38C and 38D and a large semi-circle on the elements 38A and 38B, with the same orientation. As shown, the area of the spot $S_2$ on element 38A is substantially larger than the area of that spot on element 38B, so that the difference signal $S_A-S_B$ has an increased positive value. Again, this signal $S_A-S_B$ may be visualized as the equivalent of the signal $S_B-S_A$ of FIG. 19. Accordingly, in this case, the focussing error signal is positive and the objective lens 5 is moved closer to the record surface 6.

As set forth above, the combination of the compound lens 30 or $30_1$ and the photodetector 38 consisting of four photodetecting elements 38A, 38B, 38C and 38D arranged in the same direction detects the focussing error, or equivalently, the distance between the record surface 6 of the disc and the objective lens 5. This focussing error signal is supplied to the control coil 9 as the focussing control signal by which the objective lens 5 is automatically controlled in position so as to maintain the just-focussed state, i.e. to keep the objective lens 5 at a constant distance relative to the record surface 6 of the disc.

Figure 25:
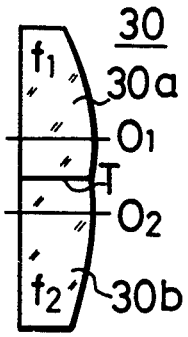
FIGS. 25 to 28 are cross-sectional views illustrating additional respective examples of compound lenses that are usable in focussing error detecting apparatus according to this invention.
Figure 26:
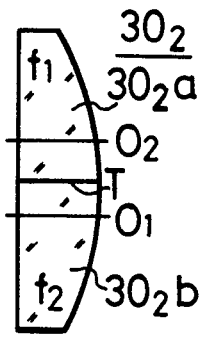
Figure 27:
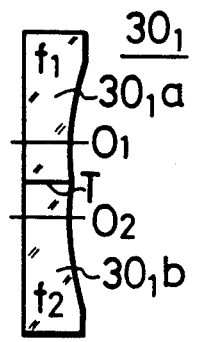
Figure 28:
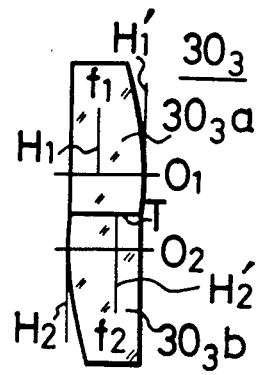

Further examples of compound lenses suitable for use in the apparatus of the present invention will now be described with reference to FIGS. 26 and 28-31 and compared with the previously described lenses 30 and $30_1$ which, for ease of such comparison, are again shown on FIGS. 25 and 27, respectively. In the compound lens 30 shown in FIG. 25, lens regions 30a and 30b are both formed as convex lenses. In compound lens $30_1$ shown in FIG. 27, lens regions $30_{1a}$ and $30_{1b}$ are both formed as concave lenses. In both these cases, the optical axes $O_1$ and $O_2$ of lens regions 30a and 30b and of lens regions $30_{1a}$ and $30_{1b}$ lie within the respective lens regions. The compound lens $30_2$ of FIGS. 26 and 29, on the other hand, represents a case in which the optical axes $O_1$ and $O_2$ of the lens regions $30_{2a}$ and lie in the other lens regions $30_{2b}$ and $30_{2a}$, respectively. Although not specifically illustrated, a compound lens for use in a focussing error detecting apparatus according to the present invention may have both the optical axes $O_1$ and $O_2$ of the two lens regions in a single one or the other of the lens regions. As shown in FIG. 28, it may also be possible to use a compound lens $30_3$ having two lens regions $30_{3a}$ and $30_{3b}$ of the same power, but with their principal faces $H_1$, $H_1'$ and $H_2$, $H_2'$ reversed in orientation, that is, facing in opposite directions.

Figure 29:
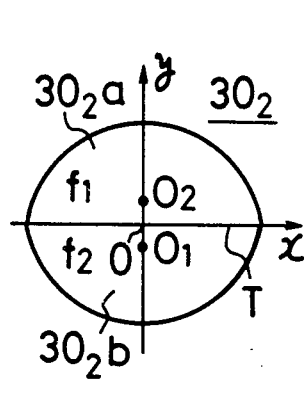
FIGS. 29 to 31 are plan views illustrating other respective examples of compound lenses that are usable in focussing error detecting apparatus according to this invention.
Figure 30:
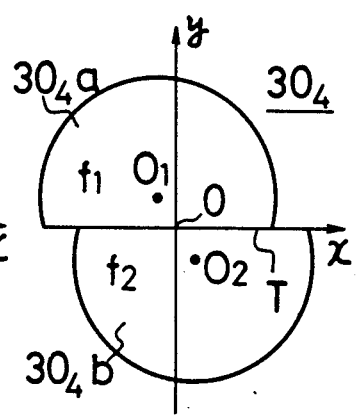
Figure 31:
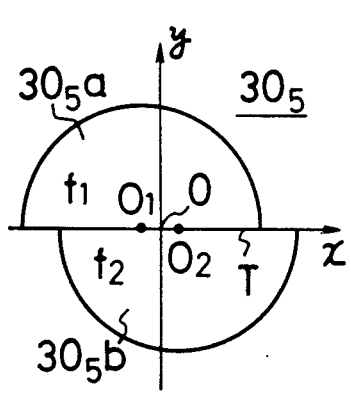

When the compound lens 30, $30_1$ or $30_2$ is placed on the x-y plane so as to locate its boundary plane T on the x-axis, then, as shown in FIGS. 16, 22 and 29, the optical axes $O_1$ and $O_2$ may be positioned at opposite sides of the boundary plane T on the y-axis. Alternatively, as shown in FIG. 30, a compound lens $30_4$ may be employed with the optical axes $O_1$ and $O_2$ of its lens regions $30_{4a}$ and $30_{4b}$ positioned on opposite sides of the boundary plane T and also at opposite sides of the y-axis. Moreover, as shown in FIG. 31, in a compound lens $30_5$, the optical axes $O_1$ and $O_2$ of the lens regions $30_{5a}$ and $30_{5b}$ may be positioned on the x-axis, that is, on the boundary plane T, at opposite sides of the y-axis.

Figure 32:
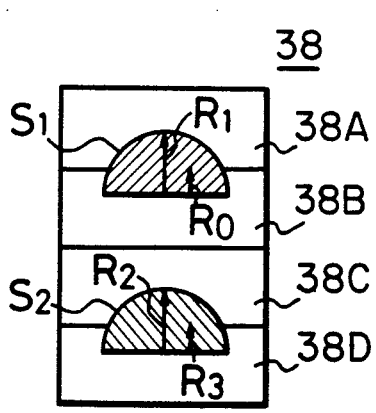
FIGS. 32 and 33 are plan views illustrating other respective examples of images on a photodetector used in a focussing error detecting apparatus according to this invention.
Figure 33:
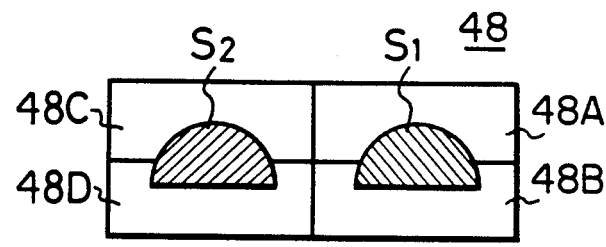

The arrangement of the four photodetecting elements in the photodetector is selected in accordance with the relationship between or arrangement of the respective optical axes $O_1$ and $O_2$ of the compound lens 30, $30_1$, $30_2$, $30_3$, $30_4$ and $30_5$. FIG. 32 shows an arrangement of the photodetecting elements 38A-38D of the photodetector 38, substantially the same as that of FIGS. 23A-23C, and which is used when the optical axes $O_1$ and $O_2$ of the lens regions forming the compound lens are positioned on the y-axis at opposite sides of the boundary plane T, as shown in FIG. 16. The arrangement shown in FIG. 32 can also be used when the compound lens $30_4$ is employed with the optical axes $O_1$ and $O_2$ slightly displaced from the y-axis, as shown in FIG. 30. When the optical axes $O_1$ and $O_2$ of the two lens regions forming the compound lens are placed on the x-axis or boundary plane T, for example, when the compound lens $30_5$ of FIG. 31 is used, photodetecting elements 48A 48B, 48C and 48D of a photodetector 48 are arranged in two rows of two elements extending in the direction of the x-axis, as shown in FIG. 33.

For the arrangement of FIG. 32, which corresponds to the embodiment of FIG. 21, it will be assumed that the radii of the semi-circular spots $S_1$ and $S_2$ on the photodetecting elements 38A, 38B and 38C, 38D of the photodetector 38 are represented as $R_1$ and $R_2$, and that the spots $S_1$ and $S_2$ extend onto the photodetecting elements 38B and 38D by the distances $R_0$ and $R_3$, with the widths of the dead zones in the photodetecting elements 38A to 38D being neglected. If the relation among these lengths $R_0$ to $R_3$ is selected so as to satisfy $R_0/R_1=R_3/R_2$ even when $R_1 \neq R_2$, then $(S_A+S_D) \approx (S_B+S_C)$, that is, the focussing error signal $(S_A+S_D)-(S_B+S_C)$ resulting from the photodetecting signals $S_A$ to $S_D$ is reduced to zero, when the apparatus is in the just-focussed state. When $R_1=R_2$ is satisfied, for the focussing error signal to be zero in the just-focussed state, it is sufficient that the amount of light incident on the photodetecting elements 38A and 38C be equal to that incident on the photodetecting elements 38B and 38D. Therefore, regardless of the length $R_0$ ($=R_3$), the focussing error signal can be reduced to zero for the just-focussed state.

The above described embodiments of the focussing error detecting apparatus according to this invention offer the following advantages. The focussing error signal may be obtained for the embodiment shown in FIG. 21 by calculating $(S_A-S_C)+(S_D-S_B)$ or $(S_A+S_O)-(S_B+S_D)$, that is, by calculating the sum of difference $S_A-S_C$ of the photodetecting signals from the photodetecting elements which receive the light passed through outer sections (considered with respect to boundary plate T) of the lens regions $30_{1a}$ and $30_{1b}$ of compound lens $30_1$ and the difference $S_D-S_B$ of the photodetecting signals from the photodetecting elements which receive the light passed through inner sections of the lens regions $30_{1a}$ and $30_{1b}$. For the embodiment shown in FIG. 15, the focussing error signal may be similarly calculated as the sum $(S_B-S_D)+(S_C-S_A)$ or $(S_B+S_C)-(S_D+S_A)$. Consequently, the resultant focussing error signal avoids the leakage of the high frequency signal due to diffraction by the pits on the optical disc and the different characteristics of the modulation of the light by the pits corresponding to spatial frequencies at the central and peripheral portions of the light spot, and therefore focussing error signal has improved precision.

Moreover, the focussing error signal $(S_A+S_D)-(S_B+S_C)$ for the embodiment shown in FIG. 21, or $S_C+S_B)-(S_D+S_A)$ for the embodiment of FIG. 15, may be obtained by calculating the sum of a difference $S_A-S_B$ (FIG. 21) or $S_B-S_A$ (FIG. 15) between the photodetecting signals from the photodetecting elements which respectively receive the light passing through outer and inner sections with respect to the boundary plane T in one lens region 30a of the compound lens 30 and a difference $S_D-S_C$ (FIG. 21) or $S_C-S_D$ (FIG. 15) between the photodetecting signals from the photodetecting elements which respectively receive the light passing through inner and outer sections with respect to the boundary plane T in the other lens region 30b of the compound lens 30. Then, because of the symmetry of the difference signals $S_B-S_A$ and $S_C-S_D$, and $S_C-S_D$, as clearly shown in FIG. 19, the focussing error signal has excellent linearity, which may be seen in FIG. 20.

Further with reference to FIG. 32, so long as $R_1=R_2$ is satisfied for the just-focussed state, the amount of light incident on the photodetecting elements 38A and 38C is equal to that incident on the photodetecting elements 38B and 38D. Therefore, regardless of the length $R_O$ (=$R_3$), the focussing error signal can be reduced to zero in the just-focussed state. Thus, even if the spots $S_1$ and $S_2$ on the photodetector 38 are both displaced relative to the latter in the direction along which the photodetecting elements 38A, 38B and 38C, 8D are arranged, the precision of the focussing error signal is not lowered.

Although preferred embodiments of the invention, have been described in detail above with reference to the drawings, it will be apparent that the invention is not limited to those precise embodiments, and that many modifications and variations could be effected by one skilled in the art without departing from the spirit or scope of the invention as defined in the appended claims.

I claim:

1. A focussing error detecting apparatus, comprising a compound lens and photodetector arranged in opposition thereto;
   said compound lens having two lens regions with different back focal lengths separated by a boundary plane adapted to include an optical axis of light incident upon said compound lens;
   said lens regions having respective optical axes which are spaced apart, and respective focal points spaced apart along said optical axes and at which light incident on said respective lens regions is focussed in the absence of any focussing error;
   said photodetector having a photodetecting face positioned along said optical axis of light midway between said focal points;
   said photodetecting face being comprised of first and second photodetecting element for receiving light passed through one of said lens regions at outer and inner sections, respectively, thereof with respect to said boundary plane, and third and fourth photodetecting elements for receiving light passed through the other of said lens regions at outer and inner sections, respectively, thereof with respect to said boundary plane;
   said first, second, third and fourth photodetecting elements producing first, second, third and fourth photodetecting signals, respectively, in response to the light respectively incident thereon; and
   means for generating a focussing error signal dependent on a difference between a sum of said first and fourth photodetecting signals and a sum of said second and third photodetecting signals.

2. A focussing error detecting apparatus according to claim 1; in which said lens regions are of the same power and have principal faces facing in opposite directions to each other.

3. A focussing error detecting apparatus according to claim 1, wherein said compound lens is of a molded plastic material.

4. A focussing error detecting apparatus according to claim 1, wherein said second and third photodetecting elements are integral with each other.

5. A focussing error detecting apparatus according to claim 1, wherein each of said lens regions is a convex lens.

6. A focussing error detecting apparatus according to claim 1, wherein each of said lens regions is a concave lens.

7. An apparatus according to claim 1, wherein said photodetecting elements are arranged along a straight line.

8. A focussing error detecting apparatus according to claim 1, wherein said light incident on said compound lens is light modulated by information recorded on an optical disc in an optical reproducing apparatus; and said focussing error signal is supplied as a focussing control signal to a servomechanism to position an objective lens of said optical reproducing apparatus.

9. A focussing error detecting apparatus according to claim 1; in which said optical axes of said lens regions are spaced apart in a direction perpendicular to said boundary plane.

10. A focussing error detecting apparatus according to claim 9; in which at least certain of said photodetecting elements are arranged in succession in a direction parallel to said direction perpendicular to the boundary plane.

11. A focussing error detecting apparatus according to claim 1; in which said optical axes of said lens regions are spaced apart in a direction parallel to said boundary plane.

12. A focussing error detecting apparatus according to claim 11; in which at least certain of said photodetecting elements are arranged next to each other in a direction parallel to said boundary plane.

13. A focussing error detecting apparatus according to claim 1; in which the optical axis of each of said lens regions extends through the respective lens region.

14. A focussing error detecting apparatus according to claim 1; in which the optical axis of each of said lens regions extends through the other of said lens regions.

15. In an optical reproducing apparatus for reproducing audio or video information recorded in tracks on an optical disc by directing an incident beam of light onto said disc through an objective lens so that said beam of light is modulated by said information, and recovering said information from beam of light, said objective lens being controlled by a servo-mechanism for movement towards and away from said disc in order to focus said incident beam of light on said disc; a. focussing error detecting apparatus comprising:
   a compound lens and a photodetector arranged in opposition thereto;
   said compound lens having two lens regions with different back focal lengths separated by a boundary plane adapted to include an optical axis of the modulated beam of light incident upon said compound lens;

said lens regions having respective optical axes which are spaced apart, and respective focal points spaced apart along said optical axes and at which light incident on said respective lens regions is focussed in the absence of any focussing error;

said photodetector having a photodecting face positioned along said optical axis of the beam of light midway between said focal points;

said photodetecting face being comprised of first and second photodetecting elements for receiving light passed through one of said lens regions at outer and inner section, respectively, thereof with respect to said boundary plane, and third and fourth photodetecting elements for receiving light passed through the other of said lens regions at outer and inner sections, respectively, thereof with respect to said boundary plane;

said first, second, third and fourth photodetecting elements producing first, second, third and fourth photodetecting signals, respectively, in response to the light respectively incident thereon;

means for generating a focussing error signal dependent on a difference between a sum of said first and fourth photodetecting signals and a sum of said second and third photodetecting signals; and said focussing error signal being supplied to said servomechanism as a focussing control signal for controlling the movement of said objective lens with respect to said optical disc.

* * * * *